United States Patent [19]

Slafer et al.

[11] Patent Number: 4,831,244
[45] Date of Patent: May 16, 1989

[54] OPTICAL RECORD CARDS

[75] Inventors: Warren D. Slafer, Arlington; Milford B. Kime, Cambridge, both of Mass.

[73] Assignee: Polaroid Corporation, Cambridge, Mass.

[21] Appl. No.: 103,745

[22] Filed: Oct. 1, 1987

[51] Int. Cl.[4] .......................... G06K 19/06
[52] U.S. Cl. .................... 235/487; 235/491; 350/3.63; 369/94
[58] Field of Search ............. 235/487, 488, 491, 454; 350/3.6, 3.61, 3.63; 369/94

[56] References Cited

U.S. PATENT DOCUMENTS

| | | | |
|---|---|---|---|
| 3,271,591 | 9/1966 | Ovshinsky | 307/258 |
| 3,432,168 | 3/1969 | Kingsbury | 369/243 |
| 3,501,586 | 3/1970 | Russell | 369/59 |
| 3,530,441 | 9/1970 | Ovshinsky | 340/173 |
| 3,647,275 | 3/1972 | Ward | 350/3.5 |
| 3,787,636 | 1/1974 | Brandt et al. | 179/100 |
| 3,858,032 | 12/1974 | Scantlin | 235/61.12 |
| 3,894,756 | 7/1975 | Ward | 283/7 |
| 4,007,462 | 2/1977 | Wetsel, Jr. | 346/1 |
| 4,020,278 | 4/1977 | Carre et al. | 358/128 |
| 4,023,185 | 5/1977 | Bloom | 346/135 |
| 4,066,460 | 1/1978 | Chang et al. | 96/48 |
| 4,066,873 | 1/1978 | Schatz | 235/487 |
| 4,107,528 | 8/1978 | Silverman | 250/317 |
| 4,150,781 | 4/1979 | Silverman et al. | 235/382 |
| 4,230,939 | 10/1980 | deBont et al. | 235/488 |
| 4,281,058 | 7/1981 | Ovshinsky et al. | 430/296 |
| 4,298,975 | 11/1981 | van der Veen et al. | 369/94 |
| 4,360,728 | 11/1982 | Drexler | 235/462 |
| 4,363,844 | 12/1982 | Lewis et al. | 428/65 |
| 4,366,235 | 12/1982 | Land | 430/496 |
| 4,376,887 | 3/1983 | Greenaway et al. | 235/487 |
| 4,471,217 | 9/1984 | Engel | 235/487 |
| 4,491,940 | 1/1985 | Tinet | 364/46 |
| 4,500,777 | 2/1985 | Drexler | 235/487 |
| 4,503,135 | 5/1985 | Drexler | 430/12 |
| 4,508,811 | 4/1985 | Gravesteija et al. | 430/270 |
| 4,510,232 | 4/1985 | Gerber | 430/494 |
| 4,542,288 | 9/1985 | Drexler | 235/487 |
| 4,543,225 | 9/1985 | Beaujean | 264/167 |
| 4,544,181 | 10/1985 | Maurer et al. | 283/74 |
| 4,581,100 | 4/1986 | Hatzakis et al. | 156/643 |
| 4,616,237 | 10/1986 | Pettigrew et al. | 346/135 |
| 4,634,850 | 1/1987 | Pierce et al. | 235/487 |
| 4,663,518 | 5/1987 | Borror et al. | 235/487 |

FOREIGN PATENT DOCUMENTS

61/190721 8/1986 Japan ................................. 7/7

OTHER PUBLICATIONS

EPA Publication No. 0,230,069, Opheij et al.
Patent Cooperation Treaty Publication No. WO 86/05620.
U.S.S.N. 050,039, p. 10.
Society for Imaging Science & Technology in the Journal of Imaging Science, vol. 31, No. 3, May/Jun. 1987, pp. 100, 106, 107.
Society of Photo-Optical Instrumentation Engineers, vol. 600, pp. 49–56, 1986, Cowans & Shafer.
Society of Photo-Optical Instrumentation Engineers, vol. 503, 1984, entire article, "The Recording & Large Scale Replication of Crossed Holographic Grating Arrays Using Multiple Beam Interferometry", by Cowan.
Optical Engineering, vol. 24, No. 5, Oct. 1985–entire article, Halographic Honeycomb Microlens by Cowan.
Society of Photo-Optical Instrumentation Engineers, vol. 240, 1981–entire article by James J. Cowan.
High Technology, Apr., 1987, p. 64, by Latamore.
The Sunday Times Magazine, Feb. 2, 1986—Entire Article.

*Primary Examiner*—Jeffrey A. Gaffin
*Attorney, Agent, or Firm*—Leslie J. Payne; Edward S. Roman

[57] ABSTRACT

Various configurations of rectangular optical information storage card include an information surface arranged in a generally concentric and/or spiral format so that the information surface can be read as the card is rotated. Such configurations can include an embossed layer to form an information surface.

59 Claims, 3 Drawing Sheets

OPTICAL RECORD CARDS

BACKGROUND OF THE INVENTION

This invention relates generally to optical information storage cards and, more particularly, to optical informationsstorage cards of wallet size having optical media integrally formed therewith, which are encoded and encodable with machine readable code.

In the information society of today need exists for storing and, of course, retrieving information in a manner which provides rapidity, low cost, reliability and which is condensed for economy of storage. It is expected that this need will be, in part, met by information storage cards such as bank, medical record, and the like which will have high-capacity data storage features and can be carried in a wallet.

Furthermore, it is desirable to write information on the cards subsequent to their being issued. Such features add measurably to the versatility of these cards. Additionally,iit is desirable to have such cards constructed in such a manner that they can be read and/or written on simply and expeditiously.

With the relatively recent progress in optical recrrding techniques, optically encoded and/or encodable media are preferred in many situations because they can store significantly higher amounts of information than, for example, correspondingly sized magnetic media. Such storage capacity is preferable in situations where digital image storage is contemplate,, such as in medical storage or record cards.

A wide variety of optical recording media and optical storage cards already exist. Representative examples of such media and cards can be found in the following U.S. Pat. Nos: 3,647,275; 3,858,032; 3,894,756; 4,007,462; 4,023,185; 4,066,873; 4,150,781; 4,230,939; 4,298,975; 4,360,728; 4,500,777; 4,503,135; 4,508,811; 4,510,232; 4,542,288; 4,543,225; 4,544,181; 4,616,237; 4,663,518; and Japanese patent No. 61-190721.

SUMMARY OF THE INVENTION

In accordance with the present invention, provision is made for improved optical information storage cards. In an illustrated embodiment,pprovision is made for a rectangular information storage card including a substrate which has on at least one side, surface relief formations which form a machine readable surface. Overlying the information surface is a protection layer. The substrate and the protection layer are transmissive to a selected range of electromagnetic radiation usable for optically reading the information surface. The information surface is arranged in a generally concentric and/or spiral format, whereby the information surface can be read as the card is rotated about an axis. In this embodiment, the surface relief formations are formed by embossing sheet material.

In another illustrated embodiment, a reflection layer is provided which is juxtaposed the information surface. The reflection layer is, of course, reflective to at least some of the preselected range of electromagnetic radiation used for reading. The optical information card is read by virtue of reflection through either the substrate or protection layer provided that the respective substrate or protection layer is transmissive to the preselected range of electromagnetic radiation used.

In another illustrated embodiment of a card of the kind noted provision is made for a substrate having on at least one surface thereof an optically writable textured surface having a predetermined pattern which is strongly absorbent of at least a predetermined band of spectral wavelengths of incident writing electromagnetic radiation and which may be written on because of physical distortion of the predetermined pattern by such radiation; and, an optically readable set of surface relief formations which facilitate optical machine reading thereof. A protection layer is superposed over the textured layer and the optically readable surface formations. Both the substrate and the protection layer are transmissive to electromagnetic radiation used for optically reading the surface relief formations and the writable surface. In this embodiment, an air gap is provided over the textured surface.

In another illustrated embodiment of a card of the kind last noted, provision is made for a reflection layer being in superposed relationship to both the writable textured surface and the surface relief formations. The reflection layer is made of a material which when subjected to the reading radiation can be read in a reflection mode. Also, a gap is provided over the textured surfaces having the reflection layer thereover. The optical information card can be read by virtue of reflection through either the substrate or protection layer provided that the latter layers are transmissive oo the preselected range of electromagnetic radiation used.

In another illustrated embodiment, there is provided an optical card of the last noted type having an information surface with a reflection layer thereover and which is covered with an optically writable substrate. The optically witable substrate includes a first color imaging compound which is responsive to incident radiant energy within a dffferent select range of spectral wavelengths for affecting a visually discernible change in the spectral absorption characteristics thereof so that colored pictorial images of the card holder, colored text and machine readable digital code may be recorded by the same recording apparatus. In antther embodiment of a card of the last noted type, the reflection layer is omitted and the card can be read in transmission.

In another illustrated embodiment there is depicted a card having an information surface of the kind noted above that is covered with an optically writable substrate. The substrate is made of a phase change optically writable material which when subjected to preselected electromagnetic energy changes its spectral absorption properties in a manner so that it can be read in an optical reading mode. A protection layer is superposed over the writable substrate. The information surface can be read in the reflection mode through the substrate or the protection layer if a reflection layer is provided in juxtaposed relationship to the information surface.

In another illustrated embodiment, there is provided an erasable optical card of the above type comprising: a first substrate having on at least one surface thereof, surface formations forming an optical machine readable information surface. A reflection layer is disposed in superposed relationship to the information surface to reflect at least some of a select range of reading electromagnetic spectral wavelengths used for reading the information surface. A second substrate is disposed in overlying relationship to the reflection layer. The second substrate is made of material which allows machine readable information to be optically written thereon, as well as optically erased therefrom. The second substrate is transmissive to the select reading range and a protection layer is disposed in overlying relationship to the second substrate. In another embodiment similar to the last noted type, the reflection layer is omitted and the card can be read in a transmission mode.

In another illustrated embodiment, there is provided a core substrate which has information surfaces on opposite sides thereof. The surfaces are covered by respective reflection coatings and are, in turn, covered by respective optically writable surfaces. The optically writable surfaces are covered by suitable protection layers.

Among other objects of this invention are, therefore, the provision of an optical information card which has surface relief formations that form machine readable information surfaces; the provision of an optical information card which has a machine readable information surface embossed therein, which information surface can be read by rotating the card about a rotational axis; the provision of a card of the foregoing type which can be read in a transmission mode or a reflection mode; the provision of an optical information card including a layer having embossed therein an optical machine readable information surface and an optically writable layer covering the information surface; the provision of an optical information card including a layer having embossed therein an optical machine readable information surface and an embossed textured surface which can be optically encoded with machine readable information; the provision of an information card of the above type further including an optically writable substrate overlying or adjacent an embossed machine readable information surface which writable substrate can have optically written thereon a colored pictorial image of the card holder, colored text and optically encoded machine readable data; the provision of an information card of the type having a first substrate with surface relief formations that form machine readable information surfaces and having in juxtaposed relationship thereto an optically writable substrate made of a phase-change optically writable material which when subjected to a writing type of electromagnetic energy changes phase and thereby allows the substrate to be optically written on; the provision of an information card of the last noted type wherein a reflection layer is provided in juxtaposed relationship to the information surface and either or both of the protection layer of the first substrate and writable substrate allows reading in a reflection mode; and, the provision of an information card wherein instead of an optically writable substrate there is provided an optically writable and erasable substrate which allows optical writing, reading and erasing of optically encoded data.

These and other objects, features, and the invention itself will become apparent from the following description when taken in conjunction with the accompanying drawings wherein like structure throughout the several views are indicated by like reference numerals.

DETAILED DESCRIPTION

FIGS. 1–10 illustrate several embodiments of optical information storage cards made in accordance with the principles of this invention. Each card is, preferably, the size of most wallet size card formats, for example, about 85 mm long and 54 mm wide. Such a rectangular size has been found to be convenient for not only wallets, but also automatic teller machines and the like. Of course, this invention encompasses other suitable sizes (e.g. 82 mm×59 mm) and shapes for optical storage cards of the overall kind contemplated.

Figure 1:
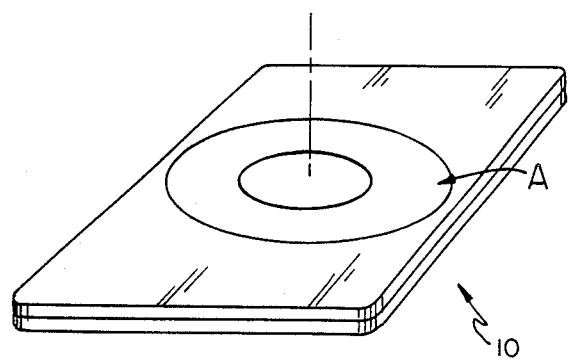
FIG. 1 is a perspective view of an optical card made according to the present invention.

As shown in FIG. 1, a card 10 made according to this invention has an annular band A of machine readable data tracks (not shown) which can be optically read by a suitable optical reading device (not shown). In some embodiments, the annular band A can also be encoded with digital or analog machine readable information subsequent to issuance of the card 10. While certain of the embodiments speak in terms of a single annular band, the present invention contemplates others, not only on one side of the card, but on the other side as well.

Figure 2:
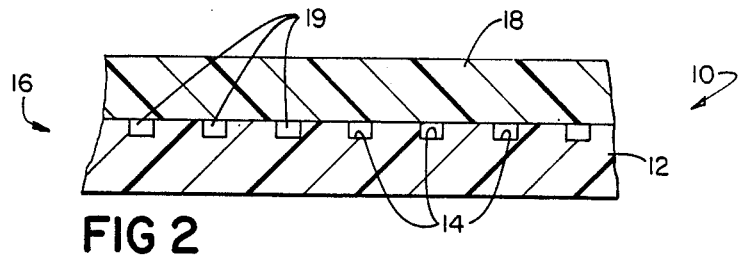
FIG. 2 is an enlrrged and fragmented cross-sectional view of an embodiment of an optical card made according to the present invention.

Reference is made to FIG. 2 wherein there is illustrated an enlarged and fragmented cross-sectional view of a simple laminar card structure, forming one embodiment of the present invention, which is intended for the transmission reading mode. The card 10 includes a substrate 12 which can have a thickness in the range of from about ½ to 50 mils, but about 30 mils is preferred for total wallet size credit card thicknesses. In this embodiment, however, the thickness of the substrate 12 is about 15 mils. The substrate 12 is made of material which is transparent to the range of electromagnetic energy that will be used to read embossed information. The substrate 12 is made of a clear homogeneous polycarbonate material, such as LEXAN, a polycarbonate manufactured by General Electric. In this case the polycarbonate substrate 12 is embossable and transparent to electromagnetic radiation in the visible range. The optical reading can be performed by conventional lasers having suitable power. However, the substrate 12 need not be transparent to visible light, but can be transparent to radiation in the non-visible range, for example, in the near infrared zone.

Other embossable materials can be used such as, polyesters like polyethylene terephthalate. These other embossable materials include polypropylene; polystyrene; vinyl; acrylic; cellulose acetate butyrate; polyesters; thin metals such as aluminum; and electron beam and ultraviolet curable polymers and epoxy-type polymers. The foregoing recitation of embossable materials is intended to be in no way limiting to the scope of the present invention.

Embossed on a surface of the substrate 12 is a pattern of varied surface relief formations in the form of grooves or pits 14 shown diagrammatically in crenelated form. The grooves or pits 14 are of the type which provide a machine readable digital information surface 16 which is optically readable by a laser type optical system that reads changes in optical phase or transmission between such grooves or pits 14 and the surrounding surface of the substrate 12. For purposes of illustration, the grooves or pits 14 can range in depth from about 0.5 $\mu$m to 0.15 $\mu$m. Preferably, however, grooves or pits 14 having an average depth of 0.10 $\mu$m can be used. Pit lengths from about 0.6 $\mu$m to 10 $\mu$m and widths from about 0.4 $\mu$m to 1.5 $\mu$m are typical. It will be appreciated, of course, that instead of pits, surface protrusions suitable for optical reading may be used.

The embossing of such an information surface 16 is accomplished by embossing the substrate 12, while the latter is part of a web, with a master die having a pattern with a relief structure which is the negative of that of the embossed information surface 16. Details of the embossing technique, per se, do not form part of this invention. Reference is, however, made to U.S. Pat. No. 4,543,225, for describing a web embossing technique which can be used in the formation of the information surface 16 on the substrate 12. This invention contemplates other web embossing techniques or other known techniques for forming such depressions such as injection molding or casting. It will be appreciated that the information surface 16 is physically integral with the structure of the card. This offers significant advantages including reduced manufacturing costs.

Figure 2A:
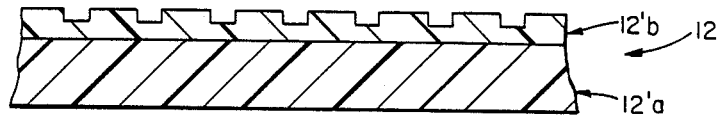
FIG. 2A is an enlarged and fragmented cross-sectional view of another embodiment of an optical card of the present invention.

This embodiment has described a one substance substrate 12. However, this invention contemplates that the substrate 12 can be made of seveaal layers. Reference is made to FIG. 2A which shows a substrate 12' having a 3 mils thick layer 12'a of polyester which can have laminated to a surface thereof an embossable layer 12'b of cellulose acetate butyrate (CAB) having a thickness of about 0.5 mils. Thus, the total thickness is about 3.5 mils. The polyester layer 12'a will provide the requisite mechanical strength and pliant characteristics needed for a wallet size card whereas the embossable layer 12'b will provide the information layer. If desired in such a multilayered structure, a suitable subbing layer (not shown) may be provided between the polyester layer 12'a and the cellulose acetate butyrate layer 12'b.

Reference is now made back to the embodiment of FIG. 2. Although this embodiment discusses an embossed digital information surface 16, it will be appreciated that the surface can have analog information embossed therein. In this embodiment, the machine readable information surface 16 is embossed such that the information data tracks (not shown) are arranged in circular and/or spiral fashion. Accordingly, the optical card 10 can be read as it is being spun about a rotational reference axis extending through the plane of the card.

The benefit of having data tracks arranged in such a fashion is that it can be used in conjunction with a relatively inexpensive optical card read system described and claimed in commonly assigned and copending application Ser. No. 050,039 filed May 15, 1987 and entitled "METHOD AND APPARATUS FOR FEEDING CARD."

Overlying the digital information surface 16 is a protection layer 18. In this embodiment, a relatively thick sheet of, for example, clear polycarbonate is used to add strength and protection to the optical information card 10. The protective polycarbonate layer 18 can have a thickness of about 15 mils. Polycarbonate of such a thickness has been found to be suitable insofar as it is sufficiently durable and wear resistant for normal card usage. This invention contemplates several alternative materials for such a layer 18. Besides using polycarbonate for the layer 18, it will be appreciated that other polyesters, such as polyethylene terephthalate can be used, as well as materials such as, polyvinyl chloride; polystyrene; an acrylic resin, such as poly(methylmethacrylate); and other suitable materials may be used.

It should be readily understood that the thickness of the wallet size optical card contemplated is about 30 mils. Thus, the thicknesses of the substrate 12 and the layer 18 can vary. For example, in connection with FIG. 2A the thickness of a protective polycarbonate layer (not shown) could be about 27 mils. Alternatively, the layer 18 could be about 3.5 mils thick and the substrate 12 could be about 27 mils thick. In situations where a thin lacquer or thin UV protector are used for the layer 18, the carrier substrate 12 would have to be correspondingly thicker than the previously noted 5 mils so as to provide the requisite strength and durability needed for the card 10. It should be understood that the thickness dimensions are a function of many factors. It will be noted that whatever combination of thicknesses the layer 18 and the substrate 12 have they should be approximately equal in sum to the recommended thickness used for most wallet size credit cards and the like.

Of course, since the card 10 of this embodiment will be read in transmission, these other materials must be optically transparent to the laser being used for reading. The layer 18 is adhered to the substrate 12 by means of a layer of conventional optical adhesive (not shown), such as Lamal which is available commercially from Morton-Thiokol. The techniques for applying such adhesives are known, and the laminating of the layer 18 to the substrate 12 can be done using conventional procedures.

In the case where both the substrate 12 and the layer 18 are made of polycarbonate, they have the same indicies of refraction. Thus, the layer 18 contacts the substrate 12 so that there are air gaps 19 formed over the depressions or grooves or pits 14, such as shown in FIG. 2, thereby allowing an optical read system to read the information surface 16 in the transmission reading mode. Air gaps 19 are not needed in the transmission mode if the substrate and layer have sufficiently different indices of refraction. Instead of air, of course, the gaps could be filled with, preferably, gaseous material having a sufficiently different refractive index than the substrate and the protection layer.

Figure 3:
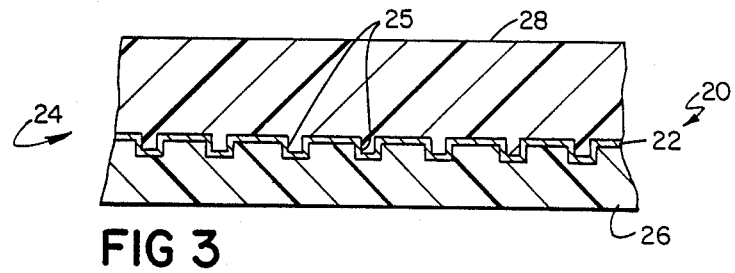
FIG. 3 is an enlarged and fragmented cross-sectional view of yet another embodiment of an optical card of the present invention.

Reference is now made to FIG. 3 for illustrating another embodiment of an optical information card 20 of the present invention. Unlike the previous embodiment, the present card 20 can be read in the reflection mode. Towards this end, a reflection layer 22 is provided so as to overlie an embossed information surface 24 defined by the grooves or pits 25 and the surrounding surface area. Because of the reflection layer 22, of course, the information surface 24 can be read with a reflected laser read beam of an optical reading head (not shown).

The information surface 24, a substrate 26 and the protection layer 28 are of the same materials having the same characteristics and made in the same manner as noted above in connection with the corresponding layers of the embodiment shown in FIG. 2. Of course such materials and characteristics thereof can also vary according to the considerations mentioned above. Since the card 20 will be read in the reflection mode, specular reflector materials can be used. In this embodiment the reflection layer 22 is juxtaposed the information surface 24. Of course, it will be appreciated that the card 20 can be read in a reflection mode from either side of the card which is not opaque to the reading radiation. The embossing may be done before or after metalizing the information surface 24.

This embodiment contemplates having the card 20 read in the reflection mode through either the substrate 26 or the protection layer 28. The reflection layer 22 can be applied in a variety of known ways, for example, by solvent means or vacuum deposition subsequent to the embossing procedure outlined above. In one embodiment, the reflection layer 22 is a metalized layer of aluminum which is applied through a conventional vacuum deposition technique which does not form part of the invention. The reflection layer 22 should have a thickness capable of achieving the foregoing reflecting function in the reading mode. For purposes of illustration and not limitation, the thickness of the reflection layer 22 can be in a range of from about 10 nanometers to hundreds of nanometers. In this embodiment, the thickness is 60 nanometers. Materials besides aluminum, of course, can be employed for reflecting all or part of the laser read beam so that changes in reflectivity of the information surface 24 can be optically read. For purposes of illustration, these other materials include, but are not limited to copper, gold, suitable alloys, dyes, etc. of comparable reflectivity. If the protection layer 28 is to be a thin layer of lacquer, it will be applied, of course, through conventional coating procedures. If the protective layer 28 is thicker, such as is the case in this embodiment, it would be bonded to the information surface by adhesives of the kind noted above in connection with FIG. 2. Also there is no need for air gaps since the card 20 will be read in a reflection mode. Thus, the protection layer 28 is brought into intimate and continuous engagement with the reflection layer 22 in a conventional lamination process or the like.

Figure 4:
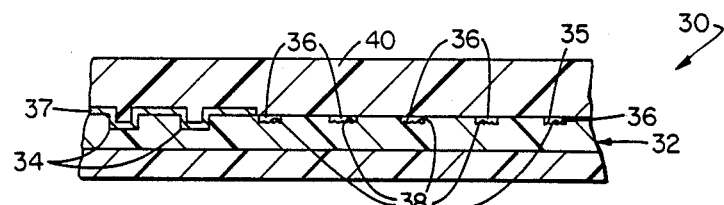
FIG. 4 is an enlarged and fragmented cross-sectional view of yet another embodiment of an optical card of the present invention.

Reference is now made to FIG. 4 to illustrate another embodiment of the present invention. In this embodiment, there is illustrated an information storage card 30 of the type which can be optically written on subsequent to issuance of the card. The card 30 includes an embossed information substrate 32 which can be made of a heat sensitive material, such as polycarbonate or polyethylene terephthalate, as well as the kinds of materials mentioned in U.S. Pat. No. 4,366,235. Prior to the embossing, the plastic must be softened by either heat, pressure, solvent or some combination of these as is known in the art. In this embodiment, the substrate 32 is made of polycarbonate and has a thickness in the range of the substrate in the first embodiment (e.g., 3 to 50 mils). The polycarbonate is transmissive to the read and write laser energy to be used. The information substrate 32 has on selected portions thereof an embossed read only pattern and an embossed optical write-once textured pattern. By textured pattern it is meant that there is formed a microstructure array of embossed patterns of filaments or cavities which can have an ordered arrangement or a random arrangement. In this application a predetermined textured pattern shall be inclusive of both ordered and random patterns. A textured pattern is one which when subjected to, for example, laser energy of predetermined wavelength and intensity will cause a physical deformation or a structural relaxation to the pattern which allows the changed structure to be read optically either in a transmission mode or a reflection mode. Accordingly, a single embossing step can economically provide a versatile information substrate or layer which allows the card 30 to be optically written on subsequent to having been encoded. Towards this end, the information substrate 32 has selected areas thereof embossed with encoded surface relief formations or information grooves or pits 34 shown diagrammatically in crenelated form. The embossed information pits 34 will be for use in machine read only form that will be read by, for example, a laser head system using a predetermined band of spectral wavelengths of electromagnetic radiation. The surface relief formations 34 are, preferably, in a generally concentric and/or spiral format so that they can be read when the card 30 is rotated.

Embossed optically writable textured surfaces shown diagrammatically at 38 are provided on other selected areas of the information substrate 32 and are also arranged in an annular format. The textured surfaces 38 comprise a predetermined pattern of embossed concentric and/or spiral grooves. The present invention contemplates arranging the read only information pits 34 and the grooved writable textured surfaces 38 in different formats. For example, the card can be provided with sectors like those on a magnetic disk, comprised of the read only information pits. The areas in between these sectors would be generally formatted and include the writable textured surfaces. Also, preformatted or pregrooved spiral tracks 35 are provided in the substrate 32 as surface relief formations which could include the textured surfaces 38 while the areas surrounding the tracks 35 would be smooth non-textured surfaces. Alternatively, the textured surfaces 38 could be placed adjacent the tracks 35.

It will be understood that whenever the textured surfaces are used, they should be provided with an air gap 36 so as to allow the structural deformation to occur when the textured surfaces 38 are struck with incident writing radiation.

Also as shown in FIG. 4, there can be provided a plurality of wide channels 39 (only one shown), each of which contains a plurality of smaller grooves 34' with textured surfaces 38'. The surfaces 38' can be formed in a manner as noted above. Instead of textured surfaces, other writable radiation sensitive materials can be placed in the grooves 34' or on lands. For purposes of illustration, the channels 39 can each have a depth dimension in the order of about ½ to 20 microns with a width varying from about 2 to 100 microns. The grooves 34' can have depth dimension in the order of about 0.05 microns to 0.15 microns. Of course air gaps 36 would be provided over the writable medium of the type just noted.

The specifics of the textured surfaces which can be used to produce a writable embossed layer does not, per se, form an aspect of this invention. Textured surfaces like those described in greater detail in the last noted patent and those described in an article written by W. Dennis Slafer and James J. Cowan and published by the Society for Imaging Science and Technology in the Journal of Imaging Science, Vol. 31, No. 3 May/June 1987 can be employed.

The present invention also contemplates in some instances providing the textured surfaces 38 with an overlayer (not shown) to enhance the energy efficiency of the laser used for writing on such surfaces. The textured surfaces 38 are highly absorptive of incident writing electromagnetic radiation within a predetermined band of spectral wavelengths. In this embodiment, the absorption of radiation of a laser writing beam at the textured surfaces 38 causes observable physical changes in the heat sensitive polycarbonate to distinguish them from other regions which are not locally heated. In this embodiment, the optically written on surfaces 38 will be read in a reflection mode by subjecting the card to an optical reading beam. Reading can be performed by observing changes in reflectivity of the textured surfaces by using a power and/or wavelength which is not significantly absorbed. In this manner, there is no unintentional writing on the information substrate 32. If reading in reflection is desired, then a reflective metal layer 37 is placed over the read only pits 34.

This invention contemplates that the textured surfaces 38 can be read in transmission. If the card 30 were to be read in a transmission mode, then there would not be need to place the reflective coating 37 over the information pits 34. If polycarbonate were to be used for the protection layer 40, then an air gap (not shown) would be provided over the grooves or pits 34 or even the tracks 35.

Overlying the information substrate 32 is a protection layer 40. The layer 40 may be made of polycarbonate which is transmissive to the spectral range of the read and/or write laser beams being used and the thickness is about 27 mils. Besides an air gap, other preferably gaseous materials having different indices of refraction than polycarbonate can be used. Besides polycarbonate other suitable materials may be used, such as those noted above in connection with the embodiments described in conjunction with FIGS. 2 and 3. The kinds of optical adhesives usable for joining the protection layer 40 to the information substrate 32 can be similar to those discussed above in relation to the embodiments described in FIGS. 2 and 3 or can be others selected so as to achieve the noted adhering and optical functions.

Although not shown, this invention envisions that the write-once embossed information surfaces 38 can also overlie or underlie the read only embossed pits. In other words, the embossed pits 34 can be formed, as described, in a separate substrate and the textured patterns 38 and the gaps 36 can be formed, as described, in another substrate which is disposed in superposed relationship either over or under the embossed pits 34. Of course, both the substrates would be transmissive to the preselected spectral wavelength ranges of reading and writing electromagnetic radiation being used. If the embossed pits 34 are to be read in a reflection mode, a reflection layer (not shown) would be associated therewith, and the embossed pits would be beneath the textured surfaces 38.

Figure 5:
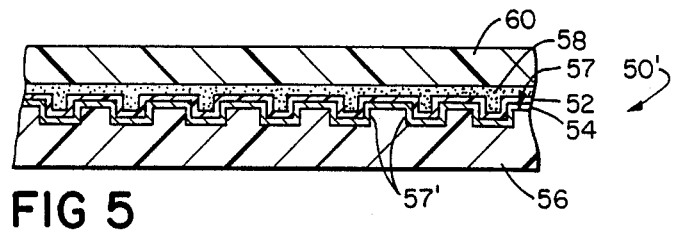
FIG. 5 is an enlarged and fragmented cross-sectional view of yet another embodiment of an optical card of the present invention.

Reference is made to FIG. 5 for showing another embodiment of an optical information card 50 which includes not only embossed information, but includes an optically, preferably laser, writable or write-once substrate 52 as well. With the use of the writable substrate 52, it will be realized that the textured surface of the last embodiment need not be employed since it would be redundant.

The writable substrate 52 is suitably adhered to a metalized reflection layer 54 overlying an embossed information relief surface 57 on substrate 56 by direct (conventional) coating techniques or by conventional optical adhesives. The reflection layer 54 and the embossed information substrate 56 are made of the same materials and in the same range of thicknesses as the respective reflection layer 22 and substrate 26 described in the embodiment of FIG. 3. Hence, reference is made to that embodiment for describing the characteristics of this embodiment.

Reference is now made to the laser writable substrate 52 which, in this embodiment, is made of a single media that can be encoded with colored pictorial images, color text and machine readable digital code. It is comprised of first, second and third coloring imaging compounds or layers (not shown) responsive or sensitive to incident electromagnetic radiation within respectively different select ranges of spectral wavelengths for effecting a visually discernible change in the spectral absorption characteristics thereof. The substrate 52 is comprised of materials which are of the type described in commonly assigned U.S. Pat. No. 4,663,518 issued May 5, 1987. Essentially, the write once substrate 52 may be printed on, as described in said last noted patent, by scanning a composite laser light having spectral wavelengths within the respectively different select ranges of spectral wavelength of the color imaging layers while simultaneously modulating the intensity of each portion of the composite laser beam to selectively expose any one of the imaging layers and, for example, provide a visually discernible colored image within the first color imaging layer. Specifically, the three color imaging layers are radiation sensitive image forming dye compounds. Preferably, they are selected to give, respectively, the subtractive colors yellow, cyan and magenta as commonly employed in photographic processes to provide full natural color. Alternatively, these imaging layers could comprise the desired additive primary colors. Examples of the heat sensitive dye compounds are given in the last patent.

The heat sensitive dye compounds can be originally colorless and absorb radiation at different predetermined wavelengths in the visible wavelength range, such as yellow, magenta and cyan colored light. The light absorbed by the respective heat sensitive compounds is converted into heat and the heat initiates an irreversible unimolecular fragmentation reaction to affect the transformation of the dye compounds from colorless to their respective yellow, magenta and cyan colors. Other heat sensitive organic dye compounds that would be equally satisfactory for the three color imaging layers are originally colored and convert absorbed light into heat which initiates an irreversible unimolecular fragmentation reaction to affect a bleaching of the dye compounds so that they become colorless.

The optically encoded digital data is read out in a manner consistent with the teachings in U.S. Pat. No. 4,663,518.

The write-once substrate 52 is, preferably, protected. One way of achieving this is to protect it in the manner described in the last noted patent. One can use a suitable adhesive layer 58, which joins a polycarbonate protection layer 60 to the substrate 52. The thickness of the protection layer 60 is such that in combination with the other layers, the total thickness of the card 50 is satisfactory for credit and identification card purposes. It will be appreciated that the read only information surface 57 can be suitably read by a laser beam of appropriate spectral wavelengths different from wavelengths at which the dye compounds absorb radiation in the reflection mode through the noted substrate 52 and protection layer 60 independent of the writing on the substrate 52. The write-once substrate 52 and the information surface 57 are preferably, arranged to have information in a generally concentric and/or spiral format. In this manner, the card can be spun during reading and writing. The optical reading of the information surface 57 can be accomplished through the use of spectral wavelengths which are transmissive to the digital information in the write-once substrate 52. Of course, the card can be read in the reflection mode through the substrate 56, if the latter is transmissive to a range of electromagnetic spectral wavelengths used for reading. This latter range of wavelengths need not be the same as those used for reading through the substrate 52. If the information substrate 56 and the write-once substrate 52 are to be read in a transmission mode, the substrate 56 is transmissive to the spectral wavelengths used to read the substrate 52 and conversely the substrate is transmissive to the spectral wavelengths used to read the information surface 57. As is readily apparent, there is no need for the reflection layer 54. Also, the substrate 56 can be formed with pretracking grooves 57' in which or adjacent to which the substrate 52 is located.

Figure 6:
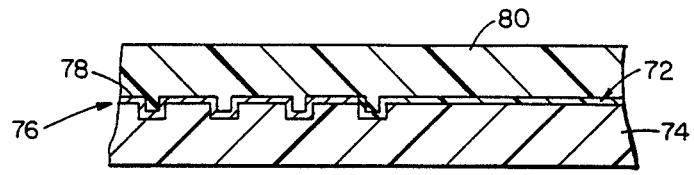
FIG. 6 is an enlarged and fragmented cross-sectional view of yet another embodiment of an optical card of the present invention.
Figure 7:
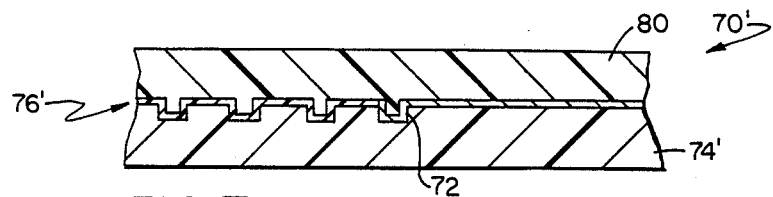
FIG. 7 is an enlarged and fragmented cross-sectional view of yet another embodiment of an optical card of the present invention.

Reference is now made to FIG. 6 for diagrammatically illustrating yet another embodiment of an optical card 70 made according to this invention. The card 70 differs from that shown in FIG. 5 insofar as an erasable optical substrate 72 is used instead of the write-once substrate 52. In this embodiment, a substrate 74, having an embossed information surface 76 and a metalized reflection layer 78 are made of the same materials and thicknesses as noted for their respective counterparts in FIGS. 3 and 5. Of course, other materials and thicknesses can be used so long as they are consistent with the teachings of this invention. The optically erasable substrate 72 of this embodiment is reflective to the range of electromagnetic spectral wavelengths usable for reading such substrate.

It will be noted that since the erasable substrate 72 of this embodiment is reflective to the range of electromagnetic radiation usable for reading the embossed information surface 76, the latter is in an adjacent relationship to the erasable substrate 72.

The erasable optical substrate 72 can be made of any of the known types of optical recording media, for example, magneto-optic, phase-change and dye-polymer recording. In this embodiment, a phase-change recording layer, such as any suitable tellurium-based film is used. In particular, the material may comprise tellurium and germanium at about 85% tellurium and 15% germanium in atomic percents with inclusion of some oxygen and/or sulphur as described in U.S. Pat. No. 3,530,441 assigned to Energy Conversion Devices. Other appropriate materials can be selected provided they are consistent with the teachings of the present invention. The thickness of such materials would also be consistent with the teachings of the last noted patent. For utilizing, the substrate 72, it is continuously switched from crystalline to non-crystalline or amorphous states by heating with a laser having selectively different power. In such embodiment, uncrystallized regions are non-reflective.

To record data, the tellurium-based substrate or film 72 is heated quickly with a high-power laser of a preselected range of spectral wavelengths. After cooling, the spot remains in the non-reflective or amorphous state. To read recorded data, a lower-power laser beam in an optical head is targeted on the card and is reflected back to a detector in the optical head. If the beam hits an amorphous spot, less light is reflected back. When the beam hits a crystallized region, the light is reflected back. To erase data, the media is heated with a diffuse beam at a suitable lower power than the write power so as to spread over a wider physical area than the write laser. A property of the tellurium-based film is that when it is slowly heated, it recrystallizes. Thus, it can be written on again. While the foregoing description has been in relation to a tellurium-based film, it is repeated that the invention contemplates other kinds of erasable optical media. Preferably, the embossed information surface 76 and the erasable substrate 72 are arranged in a generally concentric and/or spiral format which permits the card 70 to be read and/or written on and/or erased as the card is spun about at least a rotational reference axis. This embodiment envisions that the substrate 72 could be in concentric and/or spiral pretracked grooves 77 formed as surface relief formations in the substrate.

A suitable protection layer 80 made of, for example, polycarbonate can be laminated over with the other substrates. Of course, a suitable optical adhesive joins the protection layer 80 to the substrate 72 and the reflection layer 78. The thickness of the protection layer 80 when taken in combination with the other materials should be such as to provide the card 70 with a thickness suitable for wallet size cards.

Of course, the erasable substrate 72 can be made of material so that it can be read in a transmission mode. Examples of these optically erasable materials are described in said last noted patent. If the substrate 72 is going to be read in a transmission mode (see FIG. 7), it will be appreciated that the substrate 72 can overlie a substrate 74' having an embossed information surface 76'. A metalized reflection surface is not needed in the transmission mode. Also, the substrate can underlie (not shown) the embossed information surface 76' when being read in the transmission mode by a preselected range of spectral wavelengths.

Figure 8:
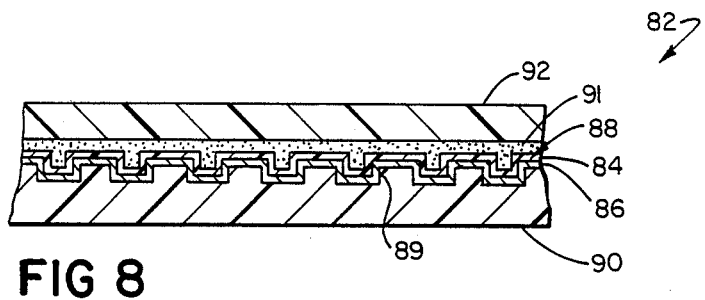
FIG. 8 is an enlarged and fragmented cross-sectional view of yet another embodiment of an optical card of the present invention; and, FIG. 9 is an enlarged and fragmented cross-sectional view of yet another embodiment of an optical card of the present invention.
Figure 9:
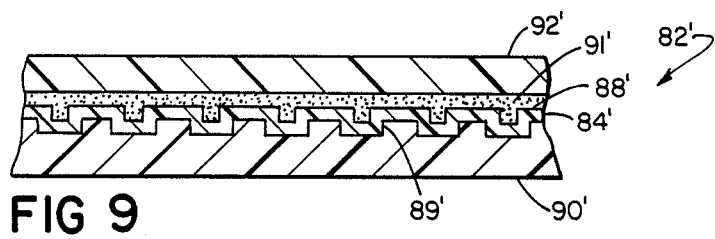

Reference is now made to FIGS. 8 and 9 for showing two additional embodiments of the present invention. These embodiments are directed to write-once optical cards 82, 82'. These cards 82, 82' differ from the embodiments shown in FIGS. 4 and 5, essentially by reason of the kind of write-once optically encodable material being used. In this embodiment, the write-once materials 84, 84' are phase change materials like tellurium-based materials of the kind described in U.S. Pat. No. 4,066,460. This patent describes use of tellurium tetrahalides preferably of the group consisting of bromine and chlorine. These materials undergo a chemical change in a dry state when subjected to imaging energy to produce a material of different chemical character or composition having at least one detectable characteristic which differs fom the characteristics of the starting material. The thicknesses of the write-once substrate and the manner of making them are described in the last noted patent.

In the embodiment shown in FIG. 8, the writable substrate 84 is suitably adhered to a metalized reflection layer 86. The layer 86 overlies an embossed information relief surface 88 which includes pretracked spiral and/or concentric grooves 89. The substrate 84 and the relief surfaces have concentric and/or spiral formats to facilitate reading by rotation on substrate 90 by conventional vacuum or chemical coating techniques or by use of conventional optical adhesives (not shown). Covering the writable substrate 84 is a protection layer 92 which is secured to the former by optical adhesives 91. The reflection layer 86, the embossed information substrate 88 and the protection layer 92 are made of the same materials and in the same range of thicknesses as their corresponding layers described in the embodiment of FIG. 3. Hence, reference is made to that embodiment for describing the characteristics of those structures in this embodiment. The card 82 can be read in the reflection mode through either or both of substrate 90 or the protection layer 92 providing, of course, they are transparent to the reading radiation used.

The embodiment of FIG. 9 is similar to that of FIG. 8, but the reflection layer 86 is omitted. Accordingly, the card 82' will be read in a transmission mode. The structure of this embodiment is like that of the previous embodiment, hence, its structure will be designated by the same reference numerals with the addition of a prime marking.

Figure 10:
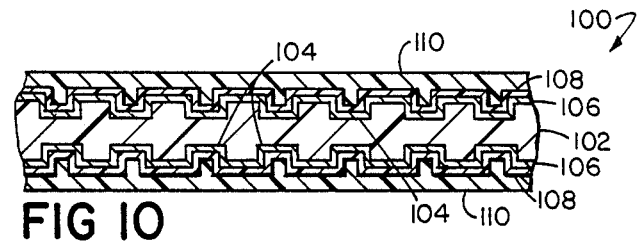
FIG. 10 is an enlarged and fragmented cross-sectional view of yet another embodiment of an optical card of the present invention.

Reference is now made to FIG. 10 for showing another embodiment of an optical card 100 according to this invention. This is a version of a flip type card wherein there is provided a sandwiched laminar card structure having a core substrate 102 which has embossed information relief surfaces 104, 104a on opposing surfaces thereof. Each information surface 104, 104a is adapted to be read in a reflection mode. Towards this end, there is provided correspondingly metalized layers 106 over the information surfaces 104, 104a. The metalized layers 106 can be made of the kinds of material as those mentioned above having, of course, appropriate thicknesses.

Referring back to the core substrate 102, it can have several constructions which would be similar to those noted in the earlier embodiments. In this embodiment, the core substrate 102 should be thick enough so that each information surface 104, 104a can have its respective grooves and/or pits not interfere with each other. Each information surface 104, 104a may have the same or different writable and/or erasable substrate combinations. In this embodiment, each information surface 104, 104a includes the write-once optically encodable material 108 which is like the write-once materials described in the embodiments shown in FIGS. 8 and 9. Hence, reference is made to those embodiments for a more detailed description of its construction and thicknesses. Covering each write-once material 108 is a protective layer 110 which can be made of the materials noted above for use in optical reading in a reflection mode and can be joined to the write-once materials 108 in a manner noted above in FIGS. 8 and 9. Of course, the total thickness of card 100 is slightly greater than that for a single sided card.

All the foregoing embodiments of the optical information card can have additional layers (not shown) as is known in the art, for example, a subbing layer to improve adhesion, an antiabrasive top coat layer (not shown) or other auxilary layers can be added to the foregoing constructions for example, holograms, photographs, magnetic recording media. Suitable subbing or compatibility layers would of course be used with this latter group of materials and layers as it is consistent with conventional practice regarding them.

Also, this invention envisions that the cards can be of a double density type, wherein opposite sides can be made with suitable combinations of the noted embodiments. For example, these flip card arrangements may include cards wherein each side is made of the read only construction noted in the earlier embodiments. In this connection each opposing side would be joined together by an adhesive and each would be read in a reflection mode. Alternatively, each of the opposing sides could include any one of the writable and/or erasable constructions noted above. In such situations the latter the constructions would, preferably, be read in a reflection mode. The opposing constructions would be joined together by suitable adhesives.

Other embodiments of the invention, including additions, subtractions, deletions and other modifications of the preferred disclosed embodiments of the invention, will be obvious to those skilled in the art and are within the scope of the following claims.

What is claimed is:

1. An optical information storage card having a rectangular format, said card comprising:
   a substrate having, on at least one side thereof, surface relief formations forming an optically machine readable information surface; and,
   a protection layer being in overlying juxtaposed relationship to said information surface;
   said substrate and said protection layer being transmissive to a selected range of electromagnetic radiation usable for optically reading said information surface;
   said information surface having a generally spiral and/or concentric format whereby said information surface can be read as said card is rotated about at least an axis wherein said information surface on said substrate includes an sheet material having been embossed to form said information surface.

2. The card of claim 1, wherein: said embossable material is selected from polycarbonate, cellulose acetate butyrate, polyester, polyethylene terephthalate, vinyl, acrylic, polystyrene, or thin metal.

3. The card of claim 1 wherein: said substrate and said layer have been formed of pliant and durable materials.

4. The card of claim 3 wherein: said substrate and said protection layer have substantially the same index of refraction, gaps are formed over depressions of said information surface between said substrate and said protection layer, and said gaps having a material with a different refractive index than said substrate and said protection layer.

5. An optical information storage card has a rectangular format, said card comprising:
   a substrate with surface relief formations on at least one surface which form a machine readable information surface;
   a reflection layer being juxtaposed with respect to said information surface and being made of a material which reflects at least some of a selected range of electromagnetic radiation so that said information surface can be optically read in a reflection mode; and, a protection layer overlying said information surface and said reflection layer;

at least one of said substrate and said protection layer being transmissive to said selected range of radiation usable for optically reading said information surface; said information surface having a generally spiral and/or concentric format, whereby said information surface can be read optically as said card is rotated about at least an axis.

6. The card of claim 5 wherein: said information surface on said substrate includes any sheet material which has been embossed to form said information surface.

7. The card of claim 6 wherein: said embossable material is selected from polycarbonate, cellulose acetate butyrate, polyester, polyethylene terephthalate, vinyl, acrylic, polystyrene, or thin metal.

8. The card of claim 5 wherein: said reflection layer is made of at least a metallic material.

9. The card of claim 8 wherein: said substrate and said layers have been formed of pliant and durable materials.

10. An optical information storage card having a rectangular format, said card comprising:

a substrate having on at least one surface thereof an optically writable textured surface having a predetermined pattern which is strongly absorbent of at least a predetermined band of wavelengths of incident writing electromagnetic radiation and which may be written on because of physical distortion of said predetermined pattern by such radiation, and at least an optically readable set of surface relief formations which facilitate optical machine reading thereof; and, a protection layer being superposed over said optically readable surface formations, said protection layer covering gaps over said textured surfaces, both said substrate and said protection layer being transmissive to electromagnetic radiation used for optically reading said relief formations and said writable surface wherein said substrate forming said textured surface and said relief formations is defined by sheet material having said writable and readable surfaces embossed thereon.

11. The card of claim 10 wherein: said embossable material is selected from polycarbonate, cellulose acetate butyrate, polyester, polyethylene terephthalate, vinyl, acrylic, polystyrene, or thin metal.

12. The card of claim 16 wherein: said substrate and said layer are formed of materials which are plant and durable.

13. The card of claim 10 wherein: said embossed writable and/or readable surfaces are arranged in a generally concentric and/or spiral format.

14. The card of claim 13, wherein: said writable surfaces are formed in depressions formed by said surface relief formations.

15. An optical information storage card having a rectangular format capable of being carried in a wallet, said card comprising:

a substrate having on at least one surface thereof an optically writable textured surface having a predetermined pattern which is strongly absorbent of at least a predetermined band of spectral wavelengths of incident writing electromagnetic radiation and substantially less absorbent of another predetermined band of spectral wavelengths of incident reading electromagnetic radiation and which may be written on because of physical distortion of said predetermined pattern by such writing radiation, and at least an optically readable set of surface relief formations which facilitate optical machine reading thereof;

a first layer in superposed relationship over said relief formations, said first layer being made of reflective material to the predetermined band of wavelengths of the reading radiation; and, a protection layer superposed over said first layer, said protection layer covering gaps over said textured surfaces;

at least one of said substrate and said protection a layer being transmissive to the electromagnetic energy used for optically reading said writable and readable surfaces.

16. The card of claim 15 wherein: said substrate forming said textured surface and said relief formations is defined by sheet material which can have said writable and readable surfaces embossed therein.

17. The card of claim 16 wherein: said substrate and said layers are formed of materials which are pliant and durable.

18. The card of claim 16 wherein: said embossable material is selected from polycarbonate, cellulose acetate butyrate, polyethylene terephthalate, vinyl, acrylic, polystyrene, or thin metal.

19. The card of claim 15 wherein: said embossed writable and/or said relief formation are arranged in a generally concentric and/or spiral format.

20. The card of claim 15, wherein: said writable surfaces are formed in depressions formed by said surface relief formations.

21. An optical information storage card having a rectangular format, said card comprising:

a first substrate having on at least one surface thereof surface relief formations some of which form a machine readable information surface;

a reflection layer covering said information surface and allowing said information surface to be optically read in a reflection mode to a preselected range of electromagnetic spectral wavelengths;

a second substrate which is optically writable and disposed in overlying relationship to said reflection layer; said second substrate including a color imaging compound disposed in overlying relation with respect to said reflection layer and comprising at least a first radiation sensitive dye responsive to incident radiant energy within a select range of spectral wavelengths for effecting a visually discernible change in the spectral absorption characteristics thereof, said imaging compound being selectively exposed to radiant energy within said select range to provide a visually discernible colored image and/or to provide a non-visually understandable machine readable code; and, a protection layer disposed in overlying relationship to said second substrate;

at least said second substrate being transmissive to at least said select range of spectral wavelengths, whereby said reflection layer overlying said information surface can be read in a reflection mode.

22. The card of claim 21 wherein: said compound is disposed in an overlying layer which is substantially coextensive with respect to said information surface and said information surface and said compound are arranged is a generally concentric and/or spiral format.

23. The card of claim 22 wherein: said compound is formed in depressions formed by said surface relief formations.

24. The card of claim 22 wherein: said first substrate has said information surface formed by embossing an embossable sheet material.

25. The card of claim 24 wherein: said embossable material is selected from polycarbonate, cellulose acetate butyrate, polyester, polyethylene terephthalate, vinyl, acrylic, polystyrene, or thin metal.

26. The card of claim 25 wherein: said substrates and said layers are made of pliant and durable materials.

27. An optical information storage card capable of being carried in a wallet, said card comprising:
   a first substrate having on at least one surface thereof surface relief formations some of which form a machine readable information surface;
   a second substrate which is optically writable and disposed in overlying relationship to said first substrate; said second substrate including a color imaging compound disposed in overlying relation with respect to said first substrate and comprising a radiation sensitive dye responsive to incident radiant energy within a select range of spectral wavelengths for effecting a visually discernible change in the spectral absorption characteristics thereof;
   said imaging compound being selectively exposed to radiant energy within said select range to provide a visually discernible colored image and/or to provide non-visually understandable machine readable code; and,
   a protection layer disposed in overlying relationship to said information surface;
   said protection layer and said first substrate being transmissive to at least said select range of spectral wavelengths, whereby said information surface can be read in a transmission mode by wavelengths in said select range of wavelengths.

28. The card of claim 27 wherein: said compound is disposed in overlying and substantially coextensive with respect to said information surface and is arranged in a generally concentric and/or spiral format.

29. The card of claim 28 wherein: said compound is formed in depressions formed by said surface relief formations.

30. The card of claim 28 wherein: said first substrate has said information surface formed by embossing an embossable sheet material.

31. The card of claim 30 wherein: said embossable material is selected from polycarbonate, cellulose acetate bytyrate, polyester, polyethylene terephthalate, vinyl, acrylic, polystyrene, or thin metal.

32. The card of claim 31 wherein: said substrates and said layer are made of pliant and durable materials.

33. An optical storage card capable of being carried in a wallet, said card comprising:
   a first substrate having on at least one surface thereof surface relief formations some of which form an optical machine readable information surface;
   a reflection layer disposed in superposed relationship to said information surface to reflect at least some of a select range of reading electromagnetic spectral wavelengths used for reading said information surface;
   a second substrate disposed in at least adjacent relationship to said reflection layer;
   said second substrate being made of material which allows machine readable information to be optically written thereon, as well as optically erased therefrom; said second substrate being transmissive to said select reading range; and,
   a protection layer disposed in overlying relationship to said second substrate.

34. The car of claim 33 wherein: said information surface and said second substrate are arranged in a generally concentric and/or spiral format so that they can be read optically when said card is rotated.

35. The card of claim 34 wherein: said second substrate is formed in depressions formed by said surface relief formations.

36. The card of claim 35 wherein: said surface relief formations are embossed in embossable sheet material.

37. The card of claim 36 wherein: said embossable material is selected from polycarbonate, cellulose acetate butyrate, polyester, polyethylene terephthalate, vinyl, acrylic, polystyrene, or thin metal.

38. The card of claim 37 wherein: said substrates and said layer are made of pliant and durable materials.

39. An optical information storage card capable of being carried in a wallet, said card comprising:
   a first substrate having on at least one surface thereof surface formations some of which form an optical machine readable information surface, said first substrate being transmissive to a select range of reading electromagnetic spectral wavelengths used for reading said information surface;
   a second substrate disposed in at least adjacent relationship to said information surface;
   said second substrate being made of material which allows machine readable information to be optically written thereon, as well as optically erased therefrom, said second substrate being transmissive to said select reading range of spectral wavelengths; and,
   a protection layer disposed in overlying relationship to said second substrate, said protection layer being transmissive to said select range of spectral wavelengths.

40. The card of claim 39 wherein: said information surface and said second substrate are arranged in a generally concentric and/or spiral format so that they can, be read optically when said card is rotated.

41. The card of claim 40 wherein: said second substrate is formed in depressions formed by said surface relief formations.

42. The card of claim 39 wherein: said first substrate includes an embossable sheet material and said surface formations are embossed.

43. The card of claim 42 wherein: said embossable material is selected from polycarbonate, polyester, cellulose acetate butyrate, polyethylene terephthalate, vinyl, acrylic, polystyrene, or thin metal.

44. The card of claim 43 wherein: said substrates and said layer are pliant and durable.

45. An optical information storage card having a rectangular format, said card comprising:
   a first substrate having on at least one surface thereof surface relief formations some of which form a machine readable information surface,
   a reflection layer covering said information surface and allowing said informaion surface to be optically read in a reflection mode to a preselected range of electromagnetic spectral wavelengths;
   a second substrate which is optically writable and disposed in adjacent relationship to said reflection layer; said second substrate being responsive to incident radiant energy within a select range of spectral wavelengths for effecting a visually discernible change in the spectral absorption characteristics thereof;

a protection layer disposed in overlying relationship to at least said second substrate;

at least said second substrate being transmissive to at least said select range of spectral wavelengths, whereby said reflection layer overlying said information surface can be read reflection mode.

46. The card of claim 45 wherein: said second substrate is a phase-change material which is disposed in overlying and substantially coextensive with respect to said information surface and is arranged in a generally concentric and/or spiral format.

47. The card of claim 46 wherein: said phase-change material is formed in depressions formed by said surface relief formations.

48. The card of claim 46 wherein: said phase-change material is a tellurium-based, write-once medium.

49. The card of claim 45 wherein: said first substrate is an embossable sheet material and said information surface is formed by embossing.

50. The card of claim 49 wherein: said embossable material is selected from polycarbonate, cellulose acetate butyrate, polyester, polyethylene terephthalate, vinyl, acrylic, polystyrene, or thin metal.

51. The card of claim 50 wherein: said substrates and said layers are made of pliant and durable materials.

52. An optical information storage card having a rectangular format, said card comprising:

a first substrate having on at least one surface thereof surface relief formations some of which form a machine readable information surface;

a second substrate which is optically writable and disposed in adjacent relationship to said first substrate layer; said second substrate being responsive to incident radiant energy within a select range of spectral wavelengths for effecting a visually discernible change in the spectral absorption characteristics thereof; and, a protection layer disposed in overlying relationship to said second substrate;

said first and second substrates being transmissive to at least said select range of spectral wavelengths, whereby said information surface can be read in a reflection mode.

53. The card of claim 52 wherein: said second substrate is a phase-change material which is disposed in an overlying layer which is substantially coextensive with respect to said information surface and is arranged in a generally concentric and/or spiral format.

54. The card of claim 53 wherein: said phase-change material is formed in depressions formed by said surface relief formations.

55. The card of claim 53 wherein: said phase-change material is a tellurium-based, write-once medium.

56. The card of claim 52 wherein: said first substrate is an embossable sheet material and said information surface is formed by embossing.

57. The card of claim 56 wherein: said embossable material is selected from polycarbonate, cellulose acetate butyrate, polyester, polyethylene terephthalate, vinyl, acrylic, polystyrene, or thin metal.

58. The card of claim 57 wherein: said substrates and said layer are made of pliant and durable materials.

59. An optical information storage card having a rectangular format, said card comprising:

a core substrate having on opposite surfaces thereof surface relief formations some of which form a machine readable information surface;

a reflection layer disposed in overlying relationship to said surface relief formations;

a pair of second substrates each of which is optically writable and disposed in overlying relationship to respective ones of said reflection layers; said second substrate being responsive to incident radiant energy within a select range of spectral wavelengths for effecting a visually discernible change in the spectral absorption characteristics thereof; and, a protection layer disposed in overlying relationship to each of said second substrates;

said second substrates being transmissive to at least said select range of spectral wavelengths, whereby said information surfaces can be read in a reflection mode.

* * * * *